Dec. 15, 1970   B. W. IVARSSON   3,546,928
PENETRATION ANALYZER
Filed May 9, 1967   4 Sheets-Sheet 1

INVENTOR.
BERTIL W. IVARSSON
BY Thomas W. Flynn

Dec. 15, 1970  B. W. IVARSSON  3,546,928
PENETRATION ANALYZER

Filed May 9, 1967  4 Sheets-Sheet 2

INVENTOR.
BERTIL W. IVARSSON
BY Thomas W. Flynn

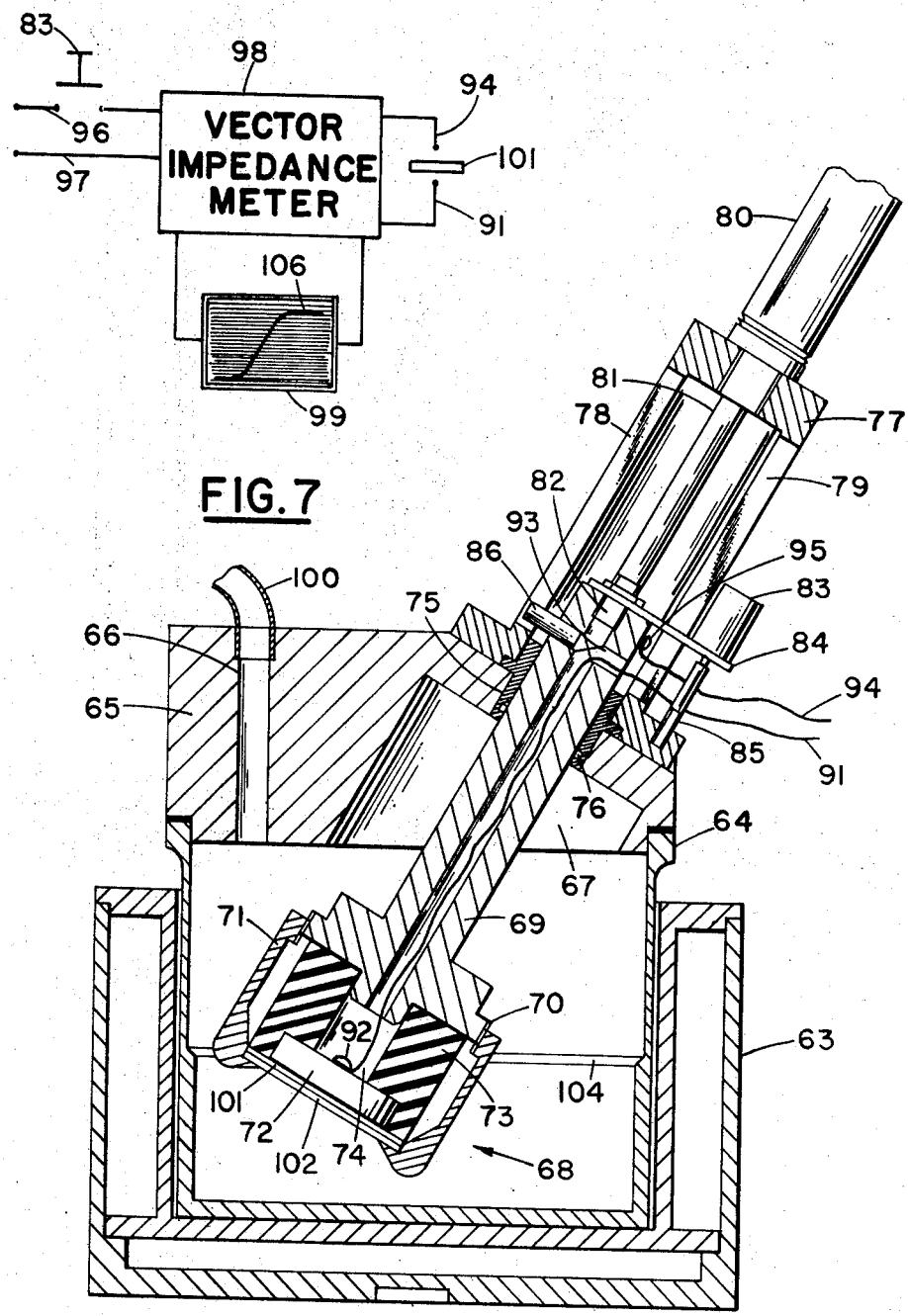

United States Patent Office 3,546,928
Patented Dec. 15, 1970

3,546,928
PENETRATION ANALYZER
Bertil W. Ivarsson, Covington, Va., assignor to Westvaco Corporation, New York, N.Y., a corporation of Delaware
Filed May 9, 1967, Ser. No. 637,156
Int. Cl. G01n 5/02, 25/56
U.S. Cl. 73—73                              11 Claims

ABSTRACT OF THE DISCLOSURE

The fluid penetration characteristics of a material are analyzed by apparatus which brings the material and a fluid into contact with each other, applys either an A.C. or D.C. voltage across the material and continuously measures the capacitance or resistance, respectively, of the material as it is penetrated by the fluid. The fluid temperature and application pressure and the area of contact between the fluid and material are maintained constant during analysis and the capacitance or resistance versus time recorded during penetration to produce curves indicative of the penetration characteristics. The penetrating ability of various liquids may be compared by testing them with the same type of absorbent material, such as a filter paper, or the absorption characteristics of various materials, such as different grades of paper, may be compared by testing each of them with the same type of fluid.

BACKGROUND OF THE INVENTION

Field of the invention

The analysis of the penetrating ability of a fluid or the absorption characteristics of a material by continuous measurement of the capacitance or resistance across the material as it is penetrated by the fluid.

Description of the prior art

An important property of many materials is their ability to absorb fluids, particularly liquids. In the manufacture of paper known as saturating medium and intended for impregnation by resins, for example, the absorption characteristics of the paper are of prime importance. On the other hand, the ability of certain liquids to penetrate various materials must be known in order to evaluate their effectiveness for such purposes as sizing and coating compositions.

Pat. No. 3,129,586 discloses apparatus, which, among other things, measures the time it takes for a fluid to penetrate a test specimen. This is done by attaching a substantially dielectric test specimen to a vertically reciprocal mounting pad, placing a drop of liquid on an opposing stationary pad, applying electric potential across the pads, bringing the test specimen into contact with the liquid, and measuring the total elapsed time from the time the liquid and specimen first touch until the circuit is completed between the two pads.

It will be apparent that unless the test specimen is substantially homogeneous, a source of error exists when using the above method. Thus, when testing paper, for example, which almost certainly will exhibit some degree of nonuniformity, the liquid will not be absorbed uniformly throughout the paper sample but will penetrate through some highly localized area of least resistance to penetration and complete the electrical circuit. The elapsed time measured, therefore, will not be an indication of the overall absorption characteristics of the sample, but only of the penetration resistance of the most pervious segment thereof.

It will also be seen that results of tests conducted in the manner described above will be influenced to a great extent by the viscosity of the liquid used. Thus, since the drop of liquid is unconfined, it will spread to an extent influenced by its viscosity when the test specimen is pressed against it; resulting in a contact area which will vary depending upon the liquid viscosity.

Additionally, if D.C. current is used when the liquid involved is ionic or characterized by polar molecules a false indication of current flow may be obtained due to the grouping of charges within the fluid adjacent the oppositely charged electrodes.

SUMMARY

By means of the present invention the overall absorption characteristics of a material or the penetrating ability of a fluid may be analyzed and displayed in graphic form to give a representation of these features of the material or fluid in their entirety.

In accordance with the present invention, a specimen of material is applied to an electrode with the specimen completely overlying the electrode and the fluid is applied to the specimen at the desired pressure and temperature. The effective contact area between the material and fluid will, therefore, always be constant and the application pressure and temperature may be maintained constant. A voltage, which may be direct current but in many instances will preferably be alternating, is applied across the specimen as it is penetrated by the fluid and an electrical property of the specimen, e.g. resistance or capacitance, is continuousnly measured as it changes due to penetration by the fluid, and these measurements recorded.

Thus, while localized areas of high permeability in a test specimen will be indicated, they will be shown in relation to the overall penetration characteristics of the test specimen, and the danger of interpreting readings for these areas as an indication of the overall absorption ability of the specimen is obviated.

Additionally, since during analysis, the fluid to be applied is confined and the test specimen completely covers the electrode, the contact area between the fluid and specimen will be constant regardless of the fluid viscosity. The results of a series of readings, therefore, may be readily compared.

It will also be seen that, if desired, an alternating current voltage may be applied across a test specimen. In this way, false indications of current flow, resulting from a grouping of charges within an ionic fluid or one characterized by polar molecules, may be avoided.

These and other objects and advantages of the present invention will become more readily apparent from the following description.

BRIEF DESCRIPTION OF THE DRAWINGS

FIG. 6 is an enlarged view of a portion of FIG. 5; and

FIG. 7 is a block diagram of a circuit which may be used when an A.C. voltage is to be applied across the test specimen.

DESCRIPTION OF THE PREFERRED EMBODIMENTS

Figure 1:
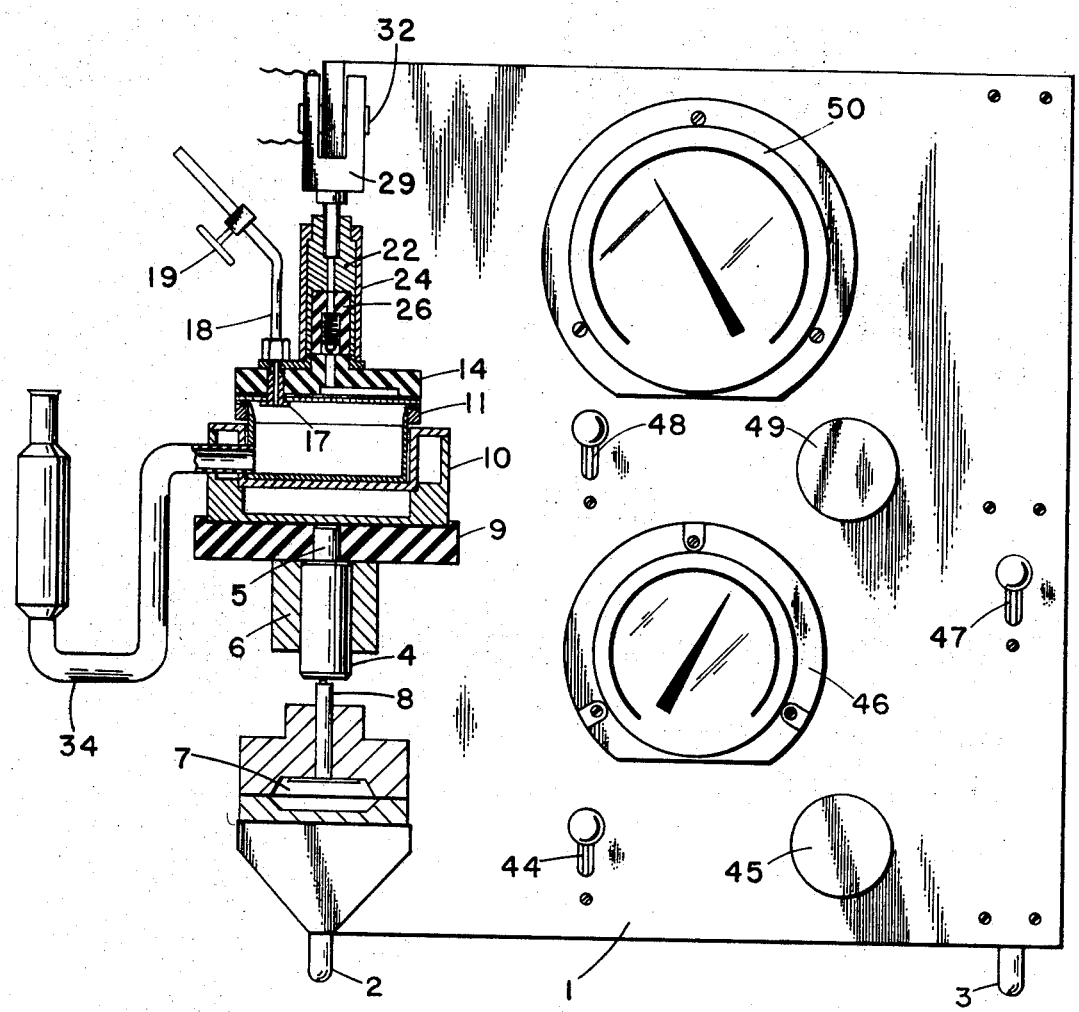
FIG. 1 is an elevational view, with parts in section, of one embodiment of the present invention.

Referring now to FIG. 1 of the drawings, it will be seen that one embodiment of the invention may comprise a supporting frame 1, having support means 2 at one end thereof and support means 3 at the opposite end. Support means 3 may be mounted by any convenient mechanism (not shown) such as a hydraulic cylinder and piston or a camming device, so that the support means 3 is vertically retractable into the body of the supporting frame 1.

A vertically extending rod 4 having a reduced portion 5 is slidably received in a bushing 6, with the bushing 6 rigidly secured to the supporting frame 1. An air cylinder 7 is also mounted on the frame 1 with its piston rod 8 contacting the lower surface of rod 4. A support plate 9, having an aperture in the center thereof to receive the reduced portion 5, rests upon the upper edge of the bushing 6 and the rod 4 when the air cylinder is in its relaxed position.

A water jacket 10 is received within a relieved portion of the support plate 9 with the water jacket surrounding a liquid container 11. In operation, the water jacket 10 will have water or some other medium at the proper temperature circulated between its spaced walls in order to maintain the liquid in container 11 at the proper temperature.

Figure 2:
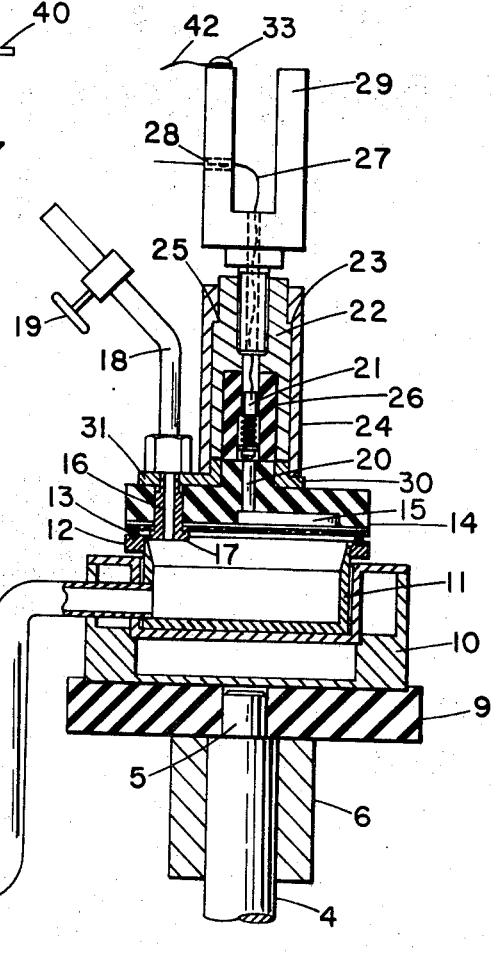
FIG. 2 is an enlarged view of a portion of the apparatus of FIG. 1.

With reference to FIG. 2, the upper edge 12 of the liquid container 11 is provided with an annular groove for receiving a sealing strip 13. Extending across the open end of the liquid container 11 is a cover plate 14 having an electrode 15 imbedded therein with one surface of the electrode facing the interior of the container. Extending through the cover plate is a bushing 16 having an outwardly directed flange 17 underlying a portion of the interior surface of the cover plate 14. Attached to the outer end of the bushing is a venting line 18, preferably formed of a transparent material such as glass, and having a manually operable valve 19 therein.

Electrode 15 has an upwardly extending portion 20, which is contacted by a rod 21, spring loaded downwardly toward the electrode 15. Rod 21 is received within a hollow shaft 22 having a shoulder 23 and surrounded by a slip fitting cylinder 24 having a relieved portion 25 for engagement with the shoulder 23. It will be noted that a major portion of the cover plate 14 is formed of an electrical insulating material, as is a bushing 26 mounted within the shaft 22 and surrounding the rod 21. An insulated wire 27 is attached to one end of the rod 21 and extends upwardly through the hollow shaft 22 and outwardly through an aperture 28 formed in the clevis 29. It will also be noted that a collar 30 is mounted on the outer surface of the cover plate 14 and has an extension 31 surrounding and contacting a portion of the bushing 16. It will also be noted that the clevis 29 is pivotally attached to the supporting frame 1 by means of a pivot pin 32 and a second electrical wire 42 is attached to the clevis 29 at any convenient point, as at 33. A substantially U-shaped filler tube 34 is also provided in fluid communication with the interior of the liquid container 11.

Figure 4:
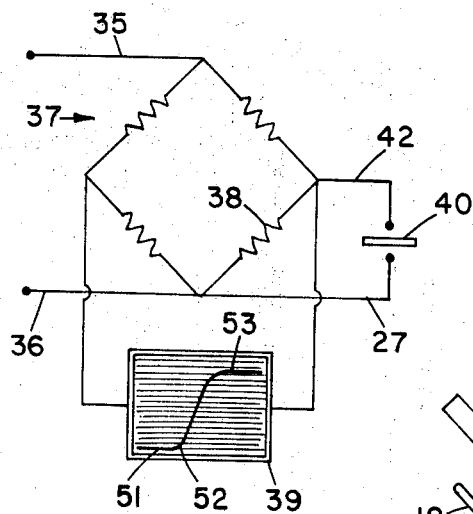
FIG. 4 is a somewhat schematic representation of a circuit which may be used when a D.C. voltage is to be applied across a test specimen.

With reference now to FIG. 4 of the drawings, one type of direct current circuitry suitable for use with the above described apparatus will be described. As seen in FIG. 4, a direct current voltage may be applied across lines 35 and 36 leading to a Wheatstone bridge, indicated in its entirety by the reference 37. The resistance in the legs of the bridge are selected so that the bridge is balanced, and the wires 42 and 27, previously described, are connected to form an open parallel circuit with one leg 38 of the bridge. A recorder 39, is connected across the bridge to give a graphical representation of changes in current, voltage, or the like, across the bridge with respect to time.

In operation, a test specimen 40 is placed against the lower surface of the cover plate 14 in contact with the electrode 15, and the bushing 16 is inserted through the paper and up through the cover plate 14. If desired, a foraminous member 41, such as a piece of screening, may be also placed across the test specimen and clamped in place by the outwardly extending flange 17 of the bushing 16. The liquid container 11 is then filled with a penetrating liquid up to a level just short of the top of the container 11. This will, of course, necessitate filling the tube 34 to the same level. The cover plate with the test specimen and if desired, the foraminous member 41, is then placed across the open end of the liquid container 11.

The shaft 22, attached to the clevis 29, is then pivoted downwardly about the pivot pin 32 and the cylinder 24 is slipped down about the shaft 22 to engage the upwardly extending portion of the bushing 30. Air cylinder 7 is then activated, raising the support plate 9 and the liquid container 11 upwardly to firmly seal the cover plate across the open end of the liquid container. In this position, the spring loaded rod 21 bears against the upwardly extending portion 20 of the electrode 15. As seen in FIG. 1, the action of the air cylinder 7 may be controlled by means of a knob 44 mounted on the support frame 1 and operating a valve (not shown) connected to a suitable source of pressure (not shown). Additionally, an adjusting knob 45 for controlling the pressure to the cylinder 7 and a pressure gauge 46 may be provided to indicate the pressure to the cylinder 7.

At this point, with the cover plate 14 sealed across the top of the container 11 the knob 47 may be actuated, causing the support means 3 to be retracted into the supporting frame 1 and causing the frame and, of course, the liquid container 11, to tilt downwardly to the right. This places the bushing 16 at substantially the highest point in the liquid container. A suitable source of pressure may then be connected to the filler tube 34 to introduce additional liquid into the container 11. If desired, the source of pressure attached to the filler tube may be controlled by the knob 48 mounted on the supporting frame and regulated by the knob 49 while a gauge 50 is used to indicate the pressure being applied to the container. Upon pressurization of the container 11 through the filler tube 34, the level of liquid in the container will rise into contact with the specimen 40. As the liquid rises, any air entrapped within the container is vented through the bushing 16 and vent line 18, which is open to the atmosphere. As soon as liquid is detected rising through the transparent vent line 18, valve 19 will be closed, since this is an indication that substantially all air has been exhausted from the container.

Just prior to the last noted operation, a voltage, such as a direct current voltage, may be applied across the lines 35 and 36 connected to the bridge 37. Since the bridge, at this point, is in a balanced condition, there will be no current flow across the bridge and the trace made on the recorder 39 will be a substantially flat line as at 51, FIG. 4. However, as the test specimen 40 is penetrated by the liquid in container 11, the open parallel circuit formed by lines 27 and 42 is closed. Thus, current will flow through line 27 to electrically conductive rod 21, and thence, through portion 20 of electrode 15 and through electrode 15 to the test specimen 40. Since bushing 16, collar 30, shaft 22 and clevis 29 will be formed of metal or some other conductive material, the current flow then proceeds from the partially penetrated specimen 40 through these elements to the line 42 attached to clevis 29. Of course, if the foraminous member 41 is used, this member, in addition to supporting the test specimen, will act as an electrode, and current flow will be from specimen 40 through member 41 and thence, through bushing 16, collar 30, shaft 22 and clevis 29. Since the test specimen 40 is in parallel with one leg 38 of the bridge, as the liquid penetrates the specimen the effective resistance of that leg of the bridge will be changed and the bridge will become unbalanced. This will result in a current flow across the bridge, which will be indicated on the recorder 39 and give a graphical representation of the absorption characteristics of the test specimen.

It should be noted that in prior art measurement devices of which applicant is aware, only the interval from the time of first contact between the specimen and the liquid to the time an electric circuit is completed through the specimen is measured. In the curve shown in FIG. 4, this would occur at approximately the point 52. Therefore, the manner in which and the rate at which the specimen continued to absorb the penetrating liquid would not be measured. With reference to FIG. 4, however, it will be seen that with the present invention, the absorption characteristics of the test specimen are measured from the time of initial contact with the liquid until substantially complete saturation of the specimen, as indicated at point 53 on the curve of FIG. 4. Thus, an overall picture of the absorption characteristics of a test specimen or the penetrating ability of a liquid, in their entirety, are graphically represented.

Figure 5:
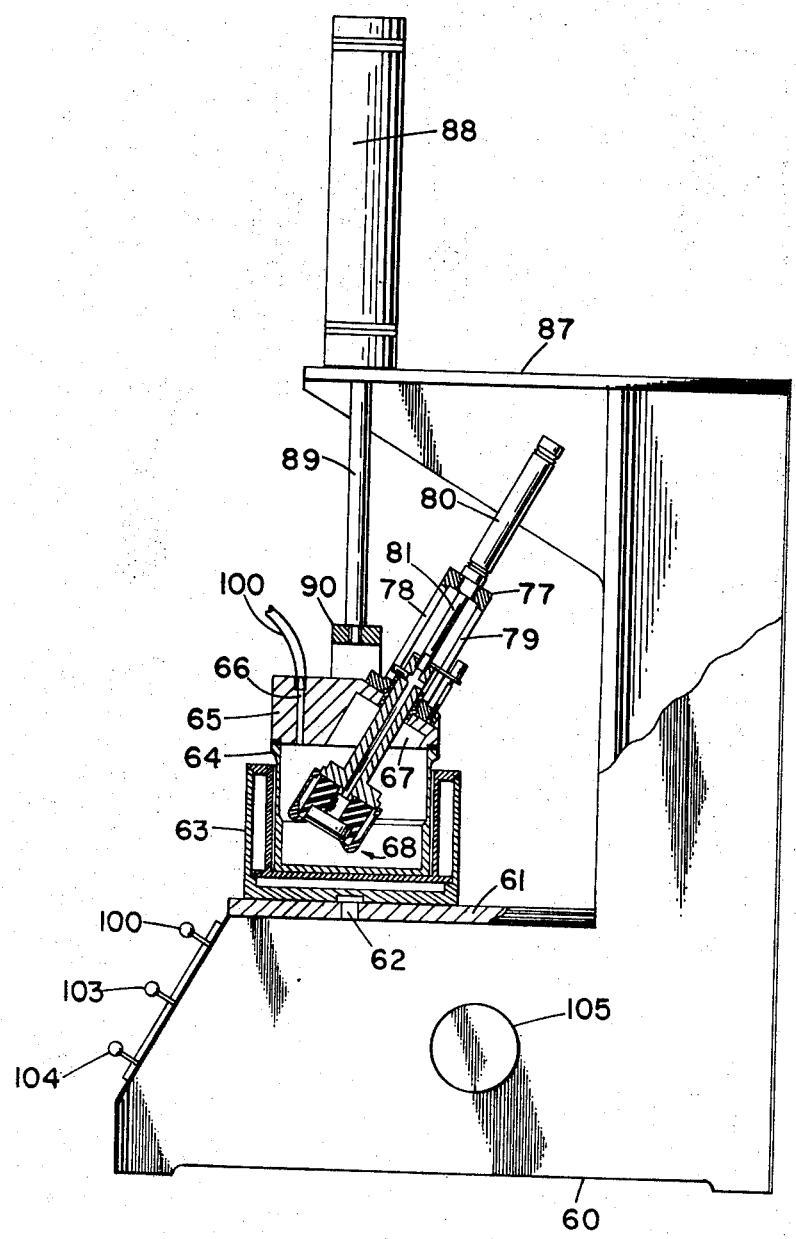
FIG. 5 is an elevational view of a second preferred embodiment of the present invention.

Referring now to FIGS. 5 through 7 of the drawings, a second preferred embodiment of the invention will be described. As seen in FIG. 5, a second form of penetration analyzer may comprise a supporting frame 60 having a support plate 61 with a centering pin 62 imbedded in the upper surface thereof and extending upwardly. A water jacket 63 is mounted on a support plate 61 and has an aperture formed in the lower surface thereof to receive the centering pin 62. The water jacket 63 surrounds an open ended liquid container 64, and as in the previous embodiment described, may have a liquid at the proper temperature circulated between its side walls to maintain the liquid in container 64 at the desired temperature.

Engaging the upper, open end of the liquid container 64 is a cover plate 65 having a opening 66 extending therethrough and a recessed portion 67 on its lower surface. The recess 67 serves to partially house an electrode assembly 68 when the electrode assembly is in its uppermost, retracted position. The electrode assembly is mounted at the end of a push rod 69 having an enlarged threaded portion 70 for receiving the clamping cap 71. An electrode 72 is mounted in the electrode assembly and insulated from the push rod 69 and clamping cap 71 by means of an electrical insulating material 73 and an air gap 74. A bushing 75 having an annular groove 76 formed therein for the reception of a sealing strip is mounted in an opening through the cover plate 65 and slidably receives the push rod 69. Mounted on the cover plate 65 and alined with the bushing 75 is a substantially cylindrical supporting bracket 77 having a pair of oppositely disposed longitudinally extending slots 78 and 79 formed therein. A cylinder and piston arrangement 80 having a piston rod 81 is mounted on the outer end of support bracket 77 with the piston rod 81 attached to the push rod 69, as at 82. Also, attached to the outer end of the push rod 69 is a push button type switch 83 mounted on a lever arm 84, extending through the slot 79; whereby the push button switch 83 may contact an adjustable stop member 85 mounted on a support bracket 77. To stabilize movement of the push rod 69 and prevent rotation thereof, a dowel pin 86 is secured to the upper end of the push rod 69 and extends through the slot 78.

From the upper end of the support frame 60 a plate member 87 extends outwardly over the support plate 61. Near the outer end of the plate member 87 a cylinder and piston arrangement 88 is mounted having a downwardly extending piston rod 89 bearing an attaching bracket 90 secured to the cover plate 65.

As best seen in FIG. 6, an electrically insulated wire 91 is attached to the electrode 72, as at 92, and extends upwardly through the center of the push rod 69 and outwardly through an aperture 93 and the slot 79. A second wire 94 is attached to the upper end of the push rod 69, as at 95, and passes outwardly through the slot 79 of the support bracket 77.

Referring now to FIG. 7 of the drawings, a block diagram of one type of alternating current circuitry suitable for use with the above described apparatus will now be described. As seen in FIG. 7, an A.C. voltage may be applied across the lines 96 and 97 leading to a vector impedance meter 98 of conventional construction. While any type of meter suitable for measuring the magnitude and phase angle of a quantity in an alternating current circuit may be used, one type that has been found suitable is the Vector Impedance Meter Model 4800 A, manufactured by the Hewlett-Packard Company. It will be noted that the push button type switch 83 is installed in the line 96 and that a conventional recording apparatus 99, similar to that previously described, may be connected to the vector impedance meter to give a continuous trace of some electrical property, e.g. capacitance, of a test specimen with respect to time.

To conduct an analysis with the apparatus of FIGS. 5 through 7, the cover plate 65 is removed from the liquid container 64 by retracting the piston rod 89 upwardly away from the support plate 61. For convenience of operation, a suitable pressure supply for the cylinder and piston arrangement 88 may be led through the support frame 60 and controlled by means of the knob 100. With the piston rod 81 in its extended position, exposing the electrode assembly 68, the test specimen is mounted on the electrode assembly by first removing the clamping cap 71 from its threaded engagement with the enlarged portion 70 of the push rod 69. The test specimen 101 is then placed across the electrode 72 and the clamping cap 71 threaded back on the push rod 69 to clamp the test specimen across the outer exposed surface of the electrode 72. If desired, a foraminous supporting member 102 may also be placed across the test specimen to support the specimen during subsequent operations.

Cylinder and piston arrangement 80 are then pressurized to cause the piston rod 81 to move upwardly and retract the electrode assembly into the recess 67 in the lower surface of the cover plate 65. For convenience of operation, the pressure line leading to the cylinder and piston arrangement 80 may be led through the supporting frame 60 for control by the knob 103. The water jacket 63 is then placed on the support plate 61 and centered by means of the centering pin 62 and the liquid container 64 placed in the water jacket. Piston rod 89 is then extended downwardly to place the cover plate 65 in sealing engagement with the upper end of the liquid container 64 and the interior of the container is pressurized by means of supply line 100, which again, for convenience of operation, may be led through the support frame 60 for control by the knob 104 and regulation by the knob 105.

The cylinder and piston arrangement 80 is then pressurized causing the piston rod 81 to extend downwardly and substantially instantaneously submerge the test specimen in the liquid contained in the container 64. Since the specimen is submerged at an angle to the liquid surface, the likelihood of air becoming entrapped between the specimen and the liquid is greatly reduced.

As the specimen is submerged, the switch 83 activates the vector impedance meter and the attached recorder 99 to give a graphical representation of the changes in an electrical property of the test specimen, e.g. capacitance, as it is penetrated by the liquid. At first, there will be no change, but as the liquid penetrates the specimen the circuit will be completed between lines 91 and 94 via electrode 72, the penetrant, and electrically conductive members 71 and 69. As in the previously described embodiment, if a foraminous support member 102 is used, this member will also act as an electrode and become part of the electrical circuit. The analyzer operator then observes the trace on the instrument 99 and when the trace reaches a substantially constant value, as at 106 in FIG. 7, the electrode assembly 69 is once again retracted into the cover plate 65 deactivating the circuit and completing the analysis of the particular specimen involved.

It will be noted that, as in the previous embodiment described, a complete description of the absorption characteristics of the test specimen, from the moment of initial contact between the specimen and the penetrating liquid to the point when the specimen becomes substantially completely saturated by the liquid, is graphically illustrated.

Figure 3:
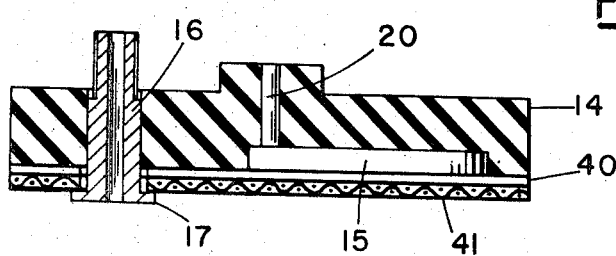
FIG. 3 is an enlarged view of a portion of FIG. 2.

It should also be noted that although a direct current circuit has been described in connection with the apparatus of FIGS. 1 through 3 and an alternating current circuit with respect to the apparatus of FIGS. 5 and 6, either circuit may be used with either embodiment of the apparatus; although the alternating current circuitry will be preferable in many instances.

While for purpose of illustration certain preferred embodiments of the invention have been described, it will be apparent that modifications thereof will occur to those skilled in the art within the scope of the appended claims.

I claim:

1. An apparatus for analyzing the penetration of a liquid through a test specimen in the form of a sheet of paper which comprises:
   (a) a container, open at the top and having a liquid therein;
   (b) a cover plate for sealing the top of said container;
   (c) a liquid impervious electrode assembly, mounted in said cover plate, comprising,
      (i) a liquid impervious electrode having at least one planar surface,
      (ii) a liquid impervious insulator encasing all of said electrode except for the planar surface thereof,
      (iii) means for providing an electrical feed-through from said electrode through said insulator to a first external terminal;
   (d) means for juxtaposing a test specimen in the form of a sheet of paper between said liquid impervious electrode assembly and the interior of said container, such that one flat side of said test specimen completely overlies the planar surface of said electrode and the edges of said test specimen are insulated from liquid contact;
   (e) means for bringing the liquid in said container in contact with the other flat side of said test specimen;
   (f) means providing an electrical circuit from the other flat side of said test specimen to a second external terminal; and
   (g) means for continuously measuring, across said first and second terminals, changes in the electrical properties of said test specimen as it is penetrated by said liquid.

2. The apparatus of claim 1 wherein said means for bringing a test specimen and a liquid into contact with each other comprises:
   (a) means for introducing liquid into said container; and
   (b) means for venting entrapped air from the interior of said container.

3. The apparatus of claim 2 further comprising:
   (a) a foraminous member abuttingly maintained against the other flat side of said test specimen and in said electrical circuit.

4. The apparatus of claim 3 comprising:
   (a) a frame;
   (b) an arm, pivotally attached to said frame at one end and attached to said cover plate at the other end;
   (c) a support plate for said container mounted on said support frame;
   (d) means for moving said support plate vertically; and
   (e) means mounted above said container for pressing said cover plate against said container in response to upward movement of said support plate.

5. The apparatus of claim 4 further comprising:
   (a) a water jacket surrounding said container.

6. The apparatus of claim 1 wherein:
   (a) said liquid impervious electrode assembly is movably mounted on the inner face of said cover plate; and
   (b) means for moving said liquid impervious electrode assembly into contact with a liquid in said container.

7. The apparatus of claim 6 further comprising:
   (a) a foraminous member,
   (b) said means for clamping a test specimen across said surface of said electrode also clamping said foraminous member to said electrode assembly.

8. The apparatus of claim 7 further comprising:
   (a) means for pressurizing the interior of said container when said container is sealed by said cover plate.

9. The apparatus of claim 8 further comprising:
   (a) a water jacket surrounding said container.

10. The apparatus of claim 9 further comprising:
    (a) a first cylinder and piston mounted above said container with a piston rod thereof extending downwardly toward said container,
    (b) said cover plate being attached to the distal end of said piston rod.

11. The apparatus of claim 10 wherein said means for moving said electrode assembly into contact with a liquid in said container comprises:
    (a) a second cylinder and piston mounted on the outer face of said cover plate with a piston rod thereof extending downwardly toward said container and angularly disposed with respect to said piston rod of said first cylinder piston, and
    (b) means extending through said cover plate and interconnecting said electrode assembly and said piston rod of said second cylinder and piston.

References Cited
UNITED STATES PATENTS

| | | | |
|---|---|---|---|
| 2,012,762 | 8/1935 | Kern | 73—159 |
| 2,329,959 | 9/1943 | Van den Akker | 73—38 |
| 3,129,586 | 4/1964 | Allen, et al. | 73—159 |
| 3,329,006 | 7/1967 | Silkin | 73—38 |
| 3,155,901 | 11/1964 | Hanken | 324—61 |
| 2,802,173 | 8/1956 | Nisle | 324—13 |
| 2,745,057 | 5/1956 | Dotson | 324—13 |
| 2,691,135 | 10/1964 | Wooding | 324—65 |

RICHARD C. QUEISSER, Primary Examiner

J. W. WHALEN, Assistant Examiner

U.S. Cl. X.R.

73—38; 324—61M